United States Patent [19]

Karcher et al.

[11] 4,036,515
[45] July 19, 1977

[54] COUPLING ASSEMBLY
[75] Inventors: Thomas D. Karcher, Rocky River; Richard J. Silagy, Parma, both of Ohio
[73] Assignee: The Hansen Manufacturing Co., Cleveland, Ohio
[21] Appl. No.: 649,092
[22] Filed: Jan. 14, 1976
[51] Int. Cl.² ............................................ F16L 37/18
[52] U.S. Cl. ..................................... 285/315; 285/319
[58] Field of Search ............... 285/315, 316, 319, 320, 285/86, 115, 116

[56]                References Cited
            U.S. PATENT DOCUMENTS

| 109,695   | 11/1870 | Westinghouse | 285/314 X |
| 2,485,763 | 10/1949 | Moon         | 285/86    |
| 2,784,987 | 3/1957  | Corcoron     | 285/315 X |
| 2,789,838 | 4/1957  | Palm         | 285/315 X |
| 2,877,437 | 3/1959  | Flanagan     | 285/116 X |
| 3,339,944 | 9/1967  | Poague       | 285/315 X |

Primary Examiner—Dave W. Arola

[57] ABSTRACT

An improved coupling assembly includes a plurality of resilient spring fingers which engage a plug to hold it against both axial and sidewise movement relative to a socket body. Each of the spring fingers has an axially inner end portion with a pair of mounting tabs which engage openings in an outer side surface of the socket body to hold the spring fingers against axial movement relative to the socket body. When the coupling assembly is in a disengaged condition, axially outer end portions of the spring fingers are disposed in a circular array having a relatively large diameter to enable the plug to be readily inserted in a socket chamber. Once the plug has been inserted into the socket chamber, a slide is moved axially relative to the socket body to resiliently deflect the spring fingers inwardly. As this occurs, radially extending retaining surfaces on the spring fingers are moved into engagement with an annular rim formed on the plug to hold the plug against axial movement relative to the socket body. As the spring fingers are deflected, axially extending major side surfaces of the spring fingers are pressed into abutting engagement with the side of the plug to hold the plug against sidewise movement. When the coupling is in the engaged condition, the slide engages outer end portions of the spring fingers to press them against the side of the plug. In addition to performing the functions of deflecting the spring fingers and pressing them against the plug, the slide engages the axially inner end portions of the spring fingers to hold them against the socket body with the mounting tabs extending into the openings in the outer side surface of the socket body.

21 Claims, 8 Drawing Figures

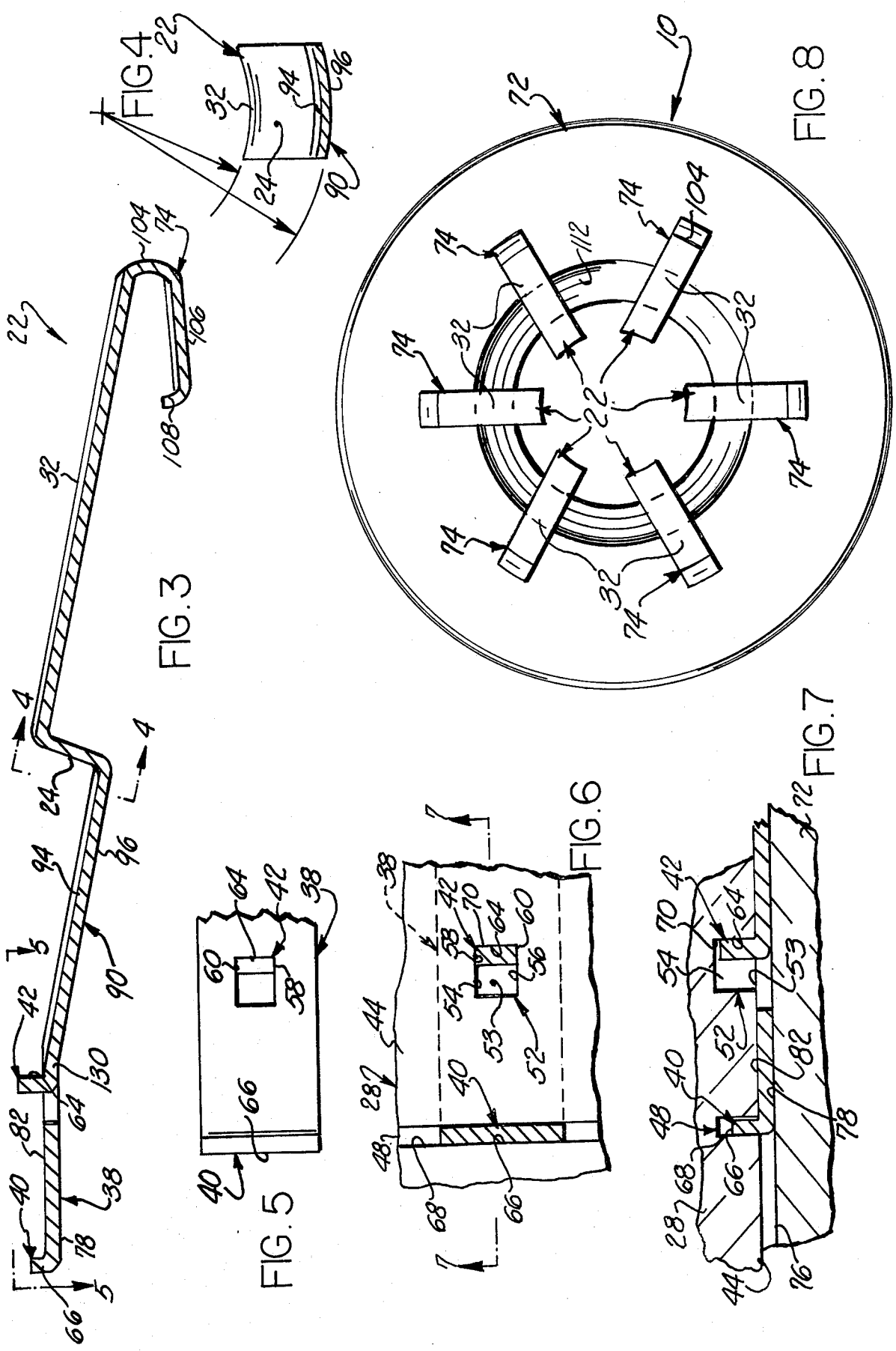

COUPLING ASSEMBLY

BACKGROUND OF THE INVENTION

This invention relates generally to a coupling assembly which is utilized to connect a pair of conduits in fluid communication and more particularly to a coupling assembly having a plurality of resiliently deflectable spring fingers which engage a plug to hold it in a socket chamber.

A known coupling assembly having resiliently deflectable spring fingers is disclosed in U.S. Pat. No. 2,784,987. The spring fingers of this known coupling assembly are either integrally formed with the socket body or individually pivoted relative to the socket body. When this known coupling assembly is to be connected, a sleeve member is utilized to deflect the spring fingers inwardly into engagement with the plug. When this known coupling assembly is connected, major side surfaces of the spring fingers extend at an acute angle to the outer surface of the plug so that the spring fingers do not resiliently grip the plug throughout a substantial portion of their axial extent to thereby hold the plug against sidewise movement.

Another known coupling assembly is disclosed in U.S. Pat. No. 747,493 and includes a plurality of separate locking spring fingers. These spring fingers have end portions which engage openings in the socket body to hold the spring fingers against axial movement relative to the socket body. The inwardly biased spring fingers are spread apart by a plug as it is inserted into the socket body. When the coupling is in the engaged condition, the major side surfaces of the spring fingers engage the socket body and are ineffective to hold the plug against sidewise movement. When this known coupling is to be disconnected, the spring fingers are spread apart by a collar on the plug to disengage the spring fingers from the plug.

Other known coupling assemblies are disclosed in U.S. Pat. Nos. 3,234,965; 2,952,482 and 2,070,013. The coupling assemblies disclosed in these patents have retaining elements which are pressed inwardly to grip a plug.

SUMMARY OF THE PRESENT INVENTION

The present invention provides a new and improved coupling assembly having a plurality of spring fingers which are utilized to hold a plug against movement relative to a socket body when the coupling is connected. Each of the spring fingers has a retaining surface which engages an annular surface on the plug to hold it against axial movement relative to the socket body. In addition, major side surfaces of the spring fingers abuttingly engage a side surface of the plug to hold it against sidewise movement relative to the socket body. The outer ends of the spring fingers are pressed against the plug by a slide member to further hold the plug against sidewise movement when the coupling is connected. When the coupling is to be disconnected, the slide member is retracted and the natural resilience of the spring fingers causes them to spread apart so that the plug can be readily withdrawn from the socket body.

Each of the spring fingers is advantageously formed as a separate unit. The separate spring fingers are mounted on the outside of the socket body. Inwardly projecting mounting tabs on each of the spring fingers extend into openings formed in the side wall of the plug body. The slide member circumscribes the plug body and presses the spring fingers against the plug body to maintain the mounting tabs in the openings in the side wall of the plug body. By mounting the spring fingers in this manner, each of the spring fingers can be separately stamped from a piece of sheet metal. In addition to facilitating the stamping of the spring fingers and the mounting of the spring fingers on the socket body, separate forming of each of the spring fingers enables a damaged spring finger to be readily replaced.

Accordingly, it is an object of this invention to provide a new and improved coupling assembly having a plurality of resiliently deflectable spring fingers which are utilized to retain a plug against both axial and sidewise movement relative to a socket body.

Another object of this invention is to provide a new and improved coupling assembly having a plurality of spring fingers which are utilized to hold a plug against movement relative to the socket body and wherein tabs formed on end portions of the spring fingers engage openings formed in a side wall of the socket body to hold the spring fingers against axial movement relative to the socket body.

Another object of this invention is to provide a new and improved coupling assembly in which a slide member is utilized to perform the functions of holding spring fingers in position on a socket body, deflecting the spring fingers into engagement with a plug as the coupling assembly is connected, and pressing the spring fingers against the plug when the coupling is connected.

BRIEF DESCRIPTION OF THE DRAWINGS

The foregoing and other objects and features of the present invention will become more apparent upon a consideration of the following description taken in connection with the accompanying drawings wherein:

FIG. 3 is an enlarged cross-sectional view illustrating the construction of a spring finger utilized in the coupling assembly of FIG. 2;

FIG. 4 is a cross-sectional view, taken along the line 4—4 of FIG. 3, further illustrating the construction of the spring finger;

FIG. 5 is an enlarged plan view, taken along the line 5—5 of FIG. 3, illustrating the relationship between a pair of spring finger mounting tabs;

FIG. 6 is an enlarged fragmentary sectional plan view illustrating the manner in which the spring finger mounting tabs of FIG. 5 engage openings in an outer side surface of a socket body;

FIG. 7 is an enlarged fragmentary sectional view, taken along the line 7—7 of FIG. 6, further illustrating the manner in which the mounting tabs engage the openings in the socket body; and FIG. 8 is a plan view, taken on a reduced scale along the line 8—8 of FIG. 1, illustrating the relationship between the spring fingers when the coupling assembly is in a disconnected condition.

DESCRIPTION OF ONE SPECIFIC PREFERRED EMBODIMENT OF THE INVENTION

Figure 1:
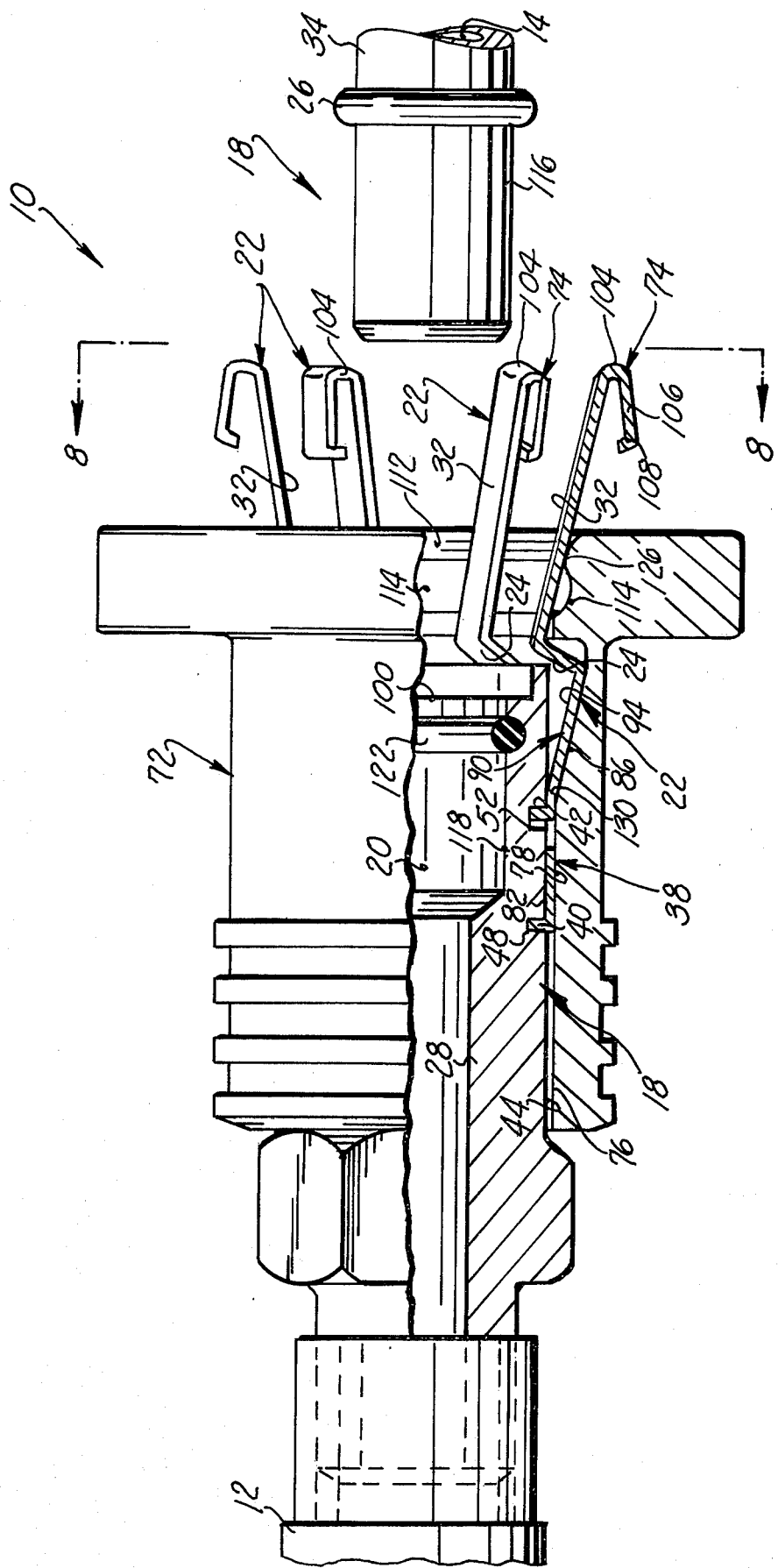
FIG. 1 is an enlarged and partially broken-away illustration of a coupling assembly constructed in accordance with the present invention, the coupling assembly being illustrated in a disconnected condition.

A coupling assembly 10 constructed in accordance with the present invention is operable from a disconnected condition (illustrated in FIG. 1) to a connected condition (illustrated in FIG. 2) to connect a pair of conduits 12 and 14 in fluid communication. The coupling assembly 10 includes a plug 18 which is held in a cylindrical socket chamber 20 by a plurality of identical spring fingers 22 when the coupling is in the connected condition. Each of the spring fingers 22 is provided with a retaining surface 24 which engages an annular rim 26 on the plug 18 to hold the plug against axial movement relative to a socket body 28. In addition, each of the spring fingers is provided with a longitudinally extending retaining surface 32 which engages a cylindrical outer side surface 34 of the plug 18 to hold the plug against sidewise movement relative to the socket body 28.

In accordance with one feature of the present invention, the spring fingers 22 are leaf springs which are separately formed from resiliently deflectable pieces of sheet metal and are individually connected with the socket body 28. Each of the spring fingers 22 (see FIG. 3) has an inner or mounting end portion 38 in which a pair of spaced apart mounting tabs 40 and 42 are formed (see FIGS. 3, 5, 6 and 7). The mounting tabs 40 and 42 cooperate with openings formed in a cylindrical outer side surface 44 of the socket body 28 to hold the spring finger 22 against both axial and sideward movement to the socket body.

The axially innermost mounting tab 40 extends radially inwardly into an annular groove 48 formed in the socket body 28 (see FIGS. 1, 6 and 7) to hold the spring finger 22 against axial movement relative to the socket body. The outer mounting tab 42 engages a recess 52 formed in the socket body 28 to hold the spring finger 22 against sidewise movement and to further retain the spring finger against axial movement relative to the socket body. The recess 52 has a square opening 53 in the socket body surface 44 with parallel side edges 54 and 56 (see FIG. 6) which engage the side edge surfaces 58 and 60 of the square mounting tab 42 to hold the spring finger 22 against sideward movement relative to the socket body 28. An outer side surface 64 of the mounting tab 42 (see FIG. 3) and an inner side surface 66 of the mounting tab 40 are spaced apart by a distance such that the side surface 66 of the mounting tab 40 is pressed firmly against one side wall 68 (see FIGS. 6 and 7) of the annular groove 48 while the surface 64 of the mounting tab 42 is pressed firmly against an axially outer side wall 70 of the recess 52 to firmly hold the spring finger 22 in place. Although a square opening 53 is illustrated, the opening could have other configurations if desired.

Figure 2:
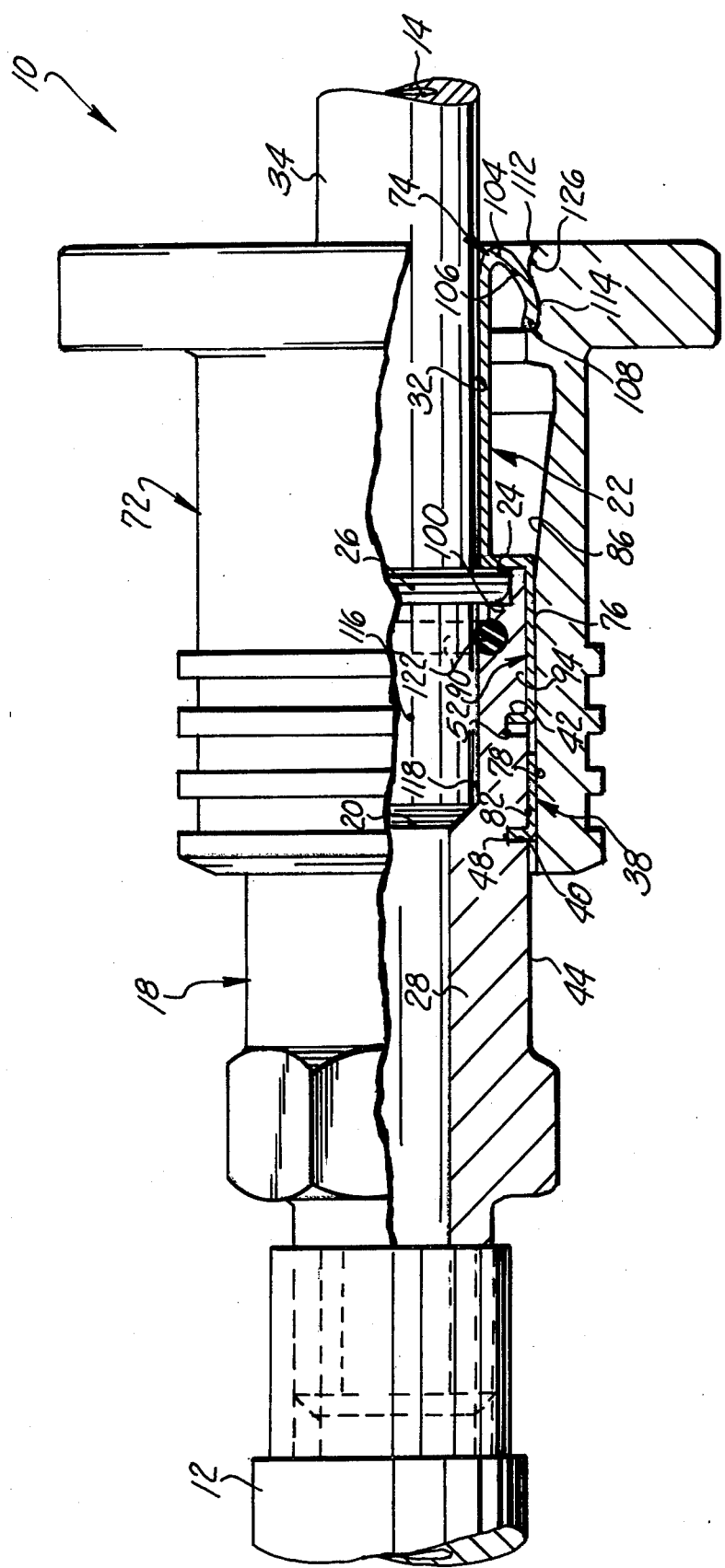
FIG. 2 is a partially broken-away illustration of the coupling assembly of FIG. 1 in a connected condition.

In accordance with another feature of the invention, a generally cylindrical slide member 72 performs the three functions of holding the mounting tabs 40 and 42 and the openings 48 and 52, deflecting the spring fingers 22 inwardly toward each other upon actuation of the coupling assembly 10 from the disconnected condition to the connected condition, and pressing the axially outer end portions of the spring fingers firmly against the cylindrical surface 34 of the plug 18 when the coupling assembly is in the connected condition. To perform the first of these three functions, the slide 72 has a cylindrical inner surface 76 which engages arcuately curved major outer side surfaces 78 (FIG. 3) on the mounting portions 38 of the spring fingers 22 to press the spring fingers firmly against the cylindrical outer side surface 44 of the socket body 28 (FIGS. 1 and 2). This radially inward pressure prevents movement of the mounting tabs 40 and 42 out of the openings 48 and 52 in the socket body.

The mounting portion 38 of the spring finger 22 has a configuration such that an inner surface 82 (FIGS. 3 and 7 has the same arc of curvature as the cylindrical outer surface 44 of the socket body 28. In addition, the outer surface 78 of the mounting portion 38 has the same arc of curvature as the cylindrical inner surface 76 of the slide 72. Therefore, the inner surface 82 on each of the spring fingers 22 extends parallel to and is held in abutting engagement with the outer surface 44 of the socket body 28 by the slide 72. The outer surface 78 on each of the spring fingers 22 extends parallel to and abuts the similarly curved cylindrical inner surface 76 (FIG. 7) of the slide 72. It should be noted that the cylindrical inner surface 76 of the slide 72 slides along the surfaces 78 of the spring fingers 22 during movement of the slide 72 between the disengaged position of FIG. 1 and the engaged position of FIG. 2.

As the slide 72 is moved axially outwardly from the disengaged position to the engaged position, a frustroconical cam surface 86 on the inside of the slide 72 cams the spring fingers 22 inwardly toward each other to resiliently deflect them into engagement with the plug 18. The frustroconical cam surface 86 is disposed in a coaxial relationship with and extends outwardly from the cylindrical surface 76. To provide for a camming action between the spring fingers 22 and the inner surface 86 of the slide 72, each of the spring fingers is provided with a longitudinally extending actuator section 90 which, when the coupling assembly 10 is in the disconnected condition, abuttingly engages the frustroconical cam surface 86 (see FIG. 1).

Upon movement of the slide 72 axially outwardly from the disengaged position of FIG. 1 to the engaged position of FIG. 2, the frustroconical surface 86 cams each of the spring fingers 22 inwardly toward the plug 18 as the surface 86 slides along the actuator portions 90 of the spring fingers 22. When the coupling assembly 10 is in the disconnected condition of FIG. 1, arcuate inner surfaces 94 on the actuator sections 90 of each of the spring fingers 22 are spaced apart from and extend at an acute angle to the cylindrical outer surface 44 of the socket body 28. As the slide member 72 is moved axially outwardly, the arcuate inner surfaces 94 of the actuator sections 90 are moved into abutting engagement with the circular outer surface 44 of the socket body by the cylindrical inner surface 76 of the slide member 72.

The inner surfaces 94 of the actuator sections 90 have the same arc of curvature as the cylindrical outer surface 44 of the socket body 28. Also, the longitudinally extending outer surfaces 96 of the actuator sections 90 have the same arc curvature as the cylindrical inner surface 76 of the sleeve 72. Therefore the sleeve presses the arcuate inner surfaces 94 of the spring fingers 22 firmly against the cylindrical outer surface 44 of the socket body 28 when the sleeve is in the engaged position of FIG. 2. At this time the annular rim 26 formed on the plug 18 is trapped between the radially extending retaining surface 24 on the spring finger 22 and an annular surface 100 of the socket body 28 to hold the plug against axial movement.

As the slide 72 is moved from the disengaged position to the engaged position, the retaining surfaces 24 move behind the rim 26 on the plug 18. In addition, the longitudinally extending retaining surfaces 32 on the spring fingers 22 are pressed against the cylindrical outer surface 34 of the plug 18. The retaining surfaces 32 have an arc of curvature which is the same as the arc of curvature of the cylindrical outer surface 34 of the plug 18. This enables the retaining surfaces 32 to extend parallel to the plug surface 34 and to abut the cylindrical plug surface throughout the longitudinal extent of the retaining surfaces 32. To provide for abutting engagement of the retaining surfaces 32 against the cylindrical plug surface 34 and for abutting engagement between the arcuate inner surfaces 94 with the cylindrical outer surface 44 of the socket body 28, each retaining surface 32 has a radius of curvature which is less than the radius of curvature of the associated inner surface 94 (see FIG. 4).

The slide 72 also cooperates with the spring fingers 22 to press the outer end portions 74 of the spring fingers firmly against the cylindrical outer surface 34 of the plug 18 when the coupling assembly 10 is connected. The end portion 74 of each spring finger 22 includes a bend 104 interconnecting the retaining surface 32 and a section 106 of the spring finger. In addition, a bend 108 is formed at the end of the section 106.

When the slide 72 is moved axially outwardly from the disengaged position of FIG. 1 to the engaged position of FIG. 2, a frustroconical surface 112 on the on the slide member 72 engages the inwardly curved or bent portions 108 of the spring fingers 22 to cam the end portions 74 of the spring fingers 22 inwardly against the cylindrical outer surface 34 of the plug 18. As this occurs, the outer end portions 74 of the spring fingers are bent at the arcuate bends 104 and the sections 106 of the spring fingers are moved inwardly to firmly press the outer end portions of the retaining surfaces 32 against the cylindrical outer surface 34 of the plug 18. Continued outward movement of the slide member 72 results in an annular recess 114 formed in the sleeve 72 axially inwardly to the cam surface 112 being engaged by the sections 106 and the bend end portions 108 of the spring fingers 22. The inside diameter of the annular recess is such that the sections 106 of the spring fingers 22 are deflected inwardly toward the plug surface 34 to maintain a firm pressure engagement between the spring finger end portions 74 and the cylindrical outer surface 34 of the plug 26. The annular recess 114 cooperates with the end portions 74 of the spring fingers 22 to hold the sleeve 72 against axial movement relative to the socket body 26 when the coupling assembly 10 is in the engaged condition. In addition, the groove 114 cooperates with the spring finger end portions 74 to prevent inadventent disassembly of the coupling by outward movement of the sleeve 72 without the plug 18 in the socket chamber 20.

Since the spring fingers 22 are arranged in circular array (see FIG. 8) about the socket body 28, the annular rim 26 is held against axial movement by a circular array of radially extending surfaces 24. In addition, the cylindrical plug surface 34 is firmly gripped between an annular array of longitudinally extending retaining surfaces 32. Therefore, when the coupling 10 is in the connected condition of FIG. 2, the plug 18 is held against both axial and sidewise movement relative to the socket body 28. The gripping action between the plug 18 and surfaces 32 allows a slight clearance to be provided between a cylindrical axially outer end portion 116 of the plug and a cylindrical socket chamber surface 118 so that the plug 18 can be readily inserted into the socket chamber 20. An O-ring seal 122 engages the cylindrical outer surface 116 of the plug 18 when the coupling is in the engaged condition to prevent a leakage of fluid between the cylindrical end portion 116 of the plug 18 and the cylindrical socket chamber surface 118.

When the coupling assembly 10 is to be disengaged, the slide member 72 is pulled axially inwardly from the engaged position shown in FIG. 2 to the disengaged position shown in FIG. 1. During the initial portion of the inward movement of the slide member 72, an annular rim 126 between the cam surface 112 and the groove 114 initially cams the spring finger sections 106 inwardly toward the plug surface 34. Continued retraction of the slide 72 moves the cam surface 112 axially inwardly of the end portions 74 on the spring fingers 22. At this time, the spring fingers 22 are still held in the engaged position of FIG. 2 by the inneraction between the cylindrical inner surface 76 of the slide member 72 and the actuator portion 90 of the spring finger 22. Still further, retraction of the slide 72 moves the frustroconical cam surface 86 adjacent to bends 130 (FIG. 3) formed between the actuator portions 90 and the mounting portions 38 of the spring fingers 22. As the minor end portion of the frustroconical cam surface 86 approaches the bends 130 in the spring fingers 22, the spring fingers 22 move outwardly away from the plug 18 so that the outer end portions 74 of the spring fingers are separated by a relatively large distance under the influence of the natural resilience of the spring fingers (see FIG. 7). As this occurs, the outer end portions 74 and the retaining surfaces 24 of the spring fingers 22 are disposed in a circular array having relatively large diameter so that the annular rim 26 on the plug 18 can move freely between the spread apart spring fingers 22.

In view of the foregoing, it is apparent that the coupling assembly 10 includes a plurality of spring fingers 22 which are utilized to hold a plug 18 against movement relative to a socket body 28 when the coupling is connected. Each of the spring fingers 22 has a retaining surface 24 which engages an annular surface 26 on the plug 18 to hold it against axial movement relative to the socket body 28. In addition, major side surfaces 32 of the spring fingers 22 abuttingly engage a side surface 34 of the plug 18 to hold it against sidewise movement relative to the socket body. The outer ends 74 of the spring fingers are pressed against the plug 18 by a slide member 72 to further hold the plug against sidewise movement when the coupling is connected. When the coupling 10 is to be disconnected, the slide member 72 is retracted and the natural resilience of the spring fingers 22 causes them to spread apart so that the plug can be readily withdrawn from the socket body.

Each of the spring fingers 22 is advantageously formed as a separate unit. The separate spring fingers 22 are outside of the socket body 28. Inwardly projecting mounting tabs 40 and 42 on each of the spring fingers 22 extend into openings 48 and 52 formed in the side wall of the plug body 28. The slide member 72 circumscribes the plug body 28 and presses the spring fingers 22 against the plug body to maintain the mounting tabs 40 and 42 in the openings 48 and 52 in the side wall of the plug body. By mounting the spring fingers 22 in this manner, each of the spring fingers can be separately stamped from a piece of sheet metal. In addition to facilitating the stamping of the spring fingers and the mounting of the spring fingers on the socket body, separate forming of each of the spring fingers enables a damaged spring finger to be readily replaced.

In the illustrated embodiment of the invention, the conduit 14 is made of metal and the plug 18 is integrally formed with the conduit 14. However, it is contemplated that the plug 18 could be formed as a separate member and connected to the conduit 14. In the illustrated embodiment of the invention six spring fingers 22 have been utilized to hold the plug 18. It is contemplated that either a greater or lesser member of spring fingers could be utilized if desired. It should also be noted that although it is preferred to form the opening 48 as an annular groove, a plurality of openings could be substituted for the annular groove.

Having described one specific preferred embodiment of the invention, the following is claimed:

1. A coupling assembly for connecting a pair of conduits in fluid communication, said coupling assembly comprising a socket body adapted to be connected with one of said conduits, said socket body including means for defining a socket chamber, a plug body adapted to be telescopically received in said socket chamber, said plug body having a longitudinally extending side surface and an annular retaining surface, a plurality of longitudinally extending spring fingers connected with the said socket body and resiliently deflectable sidewardly between an engaged position holding said plug body against axial and sidewise movement relative to said socket body and a disengaged position in which said spring fingers are ineffective to hold said plug body against movement relative to said socket body, each of said spring fingers including first surface means for engaging said annular retaining surface on said plug body to hold said plug body against axial movement relative to said socket body and a second surface means connected with and extending away from said first surface means for engaging said longitudinally extending side surface of said plug body to hold said plug body against sidewise movement relative to said socket body, said second surface means including a longitudinally extending side surface which extends parallel to and is disposed in abutting engagement with said side surface of said plug body throughout the length of said longitudinally extending side surface of said second surface means to grip said plug body between said spring fingers and hold said plug body against sidewise movement when said spring fingers are in said engaged position, said socket body including surface means for defining a plurality of spaced apart openings in an outer side surface of said socket body, each of said spring fingers having at least a pair of spaced apart projections which are received in said opening in said outer side surface of said socket body to retain said spring fingers against axial movement relative to said socket body.

2. A coupling assembly as set forth in claim 1 wherein each of said spring fingers has an axially outermost end portion which is disposed outwardly from said socket body, said axially outermost end portions of said spring fingers being disposed in a circular array having a first diameter when said spring fingers are in said engaged position and a second diameter which is larger than said first diameter when said spring fingers are in said disengaged position, said coupling assembly further including slide means for resiliently deflecting said spring fingers toward each other to effect movement of said spring fingers from said disengaged position to said engaged position.

3. A coupling assembly as set forth in claim 1 wherein each of said spring fingers is separately formed and includes third surface means for engaging said socket body to retain said sprig fingers against axial movement relative to said socket body.

4. A coupling assembly for connecting a pair of conduits in fluid communication, said coupling assembly comprising a socket body adapted to be connected with one of said conduits, said socket body including means for defining a socket chamber, a plug body adapted to be telescopically received in said socket chamber, said plug body having a longitudinally extending side surface and an annular retaining surface, a plurality of longitudinally extending spring fingers connected with the said socket body and resiliently deflectable sidewardly between an engaged position holding said plug body against axial and sidewise movement relative to said socket body and a disengaged position in which said spring fingers are ineffective to hold said plug body against movement relative to said socket body, each of said spring fingers including first surface means for engaging said annular retaining surface on said plug body to hold said plug body against axial movement relative to said socket body and a second surface means connected with and extending away from said first surface means for engaging said longitudinally extending side surface of said plug body to hold said plug body against sidewise movement relative to said socket body, said second surface means including a longitudinally extending side surface which extends parallel to and is disposed in abutting engagement with said side surface of said plug body throughout the length of said longitudinally extending side surface of said second surface means to grip said plug body between said spring fingers and hold said plug body against sidewise movement when said spring fingers are in said engaged position, said spring fingers extending axially outwardly from said socket body, said second surface means being disposed axially outwardly of said first surface means.

5. A coupling assembly as set forth in claim 4 wherein said socket body includes surface means for defining a plurality of spaced apart openings in an outer side surface of said socket body, each of said spring fingers having at least a pair of spaced apart projections which are received in said opening in said outer side surface of said socket body to retain said spring fingers against axial movement relative to said socket body.

6. A coupling assembly as set forth in claim 4 wherein each of said spring fingers has an axially outermost end portion which is disposed outwardly from said socket body, said axially outermost end portions of said spring fingers being disposed in a circular array having a first diameter when said spring fingers are in said engaged position and a second diameter which is larger than said first diameter when said spring fingers are in said disengaged position, said coupling assembly further including slide means for resiliently deflecting said spring fingers toward each other to effect movement of said spring fingers from said disengaged position to said engaged position.

7. A coupling assembly as set forth in claim 4 wherein each of said spring fingers is separately formed and includes third surface means for engaging said socket body to retain said spring fingers against axial movement relative to said socket body.

8. A coupling assembly for connecting a pair of conduits in fluid communication, said coupling assembly comprising a socket body adapted to be connected with one of said conduits, said socket body including inner surface means for defining a socket chamber and outer surface means for defining a plurality of spaced apart side openings in said socket body, a plug body adapted to be telescopically received in said socket chamber, a plurality of spaced apart spring fingers, each of said spring fingers having at least a pair of spaced apart projections which are received in said side openings in said socket body to retain said spring fingers against axial movement relative to said socket body, at least one projection on each of said spring fingers extending into an associated one of said plurality of side openings in said socket body, said associated one of said side openings having a surface which engages the associated one of said projections to retain the spring finger against sideward movement in a direction transverse to the longitudinal axis of the spring finger, slide means disposed on said socket body for holding said spring fingers in locking engagement with said plug body to thereby retain said plug body in said socket chamber, said slide means being movable relative to said socket body between an engaged position in which said slide means is effective to hold said spring fingers in engagement with said plug body and a disengaged position in which said slide means is ineffective to hold said spring fingers in engagement with said plug body, said slide means including surface means for preventing movement of said projections on said spring fingers out of said side openings in said socket body when said slide means is in said engaged and disengaged positions.

9. A coupling assembly as set forth in claim 8 wherein one of said side openings in said socket body has an annular configuration and circumscribes said socket body, at least one of said projections on each of said spring fingers being disposed in said annular side opening.

10. A coupling assembly as set forth in claim 8 wherein said projections are disposed on axially inner end portions of said spring fingers, said spring fingers having second portions disposed axially outwardly of said inner end portions, said second portions of said spring fingers being spaced apart from said plug body when said plug body is disposed in said socket chamber and said slide means is disposed in said disengaged position, said second portion of each of said spring fingers having an inwardly protruding portion, said inwardly protruding portion of each of said spring fingers being disposed in locking engagement with said plug body when said plug body is disposed in said socket chamber and said slide means is in said engaged position.

11. A coupling assembly as set forth in claim 8 wherein each of said spring fingers has an axially outermost end portion which is disposed outwardly from said socket body, said axially outermost end portions of said spring fingers being disposed in a circular array having a first diameter when said slide means is in said engaged position and a second diameter which is larger than said first diameter when said slide means is in said disengaged position, said surface means on said slide means beig effective to resiliently deflect said spring fingers toward each other upon movement of said slide means from said disengaged position to said engaged position.

12. A coupling assembly as set forth in claim 8 wherein said spring fingers extend axially outwardly from said socket body, each of said spring fingers including surface means for engaging a longitudinally extending side surface of said plug body at location outwardly from said socket body when said slide means is in said engaged position to hold said plug body against sidewise movement.

13. A coupling assembly as set forth in claim 8 wherein said plug body has a longitudinally extending side surface and an annular retaining surface each of said spring fingers including first surface means for engaging said annular retaining surface on said plug body to hold said plug body against axial movement relative to said socket body when said slide means is in said engaged position and a second surface means connected with and extending away from said first surface means for engaging said longitudinally extending side surface of said plug body to hold said plug body against sidewise movement relative to said socket body when said slide means is in said engaged position.

14. A coupling assembly as set forth in claim 8 wherein each of said spring fingers has a first plurality of bends which form a first retaining means for engaging said plug body to hold it against axial movement relative to said socket body and a second plurality of bends which form a second retaining means for engaging said slide means to hold said slide means in said engaged position.

15. A coupling assembly as set forth in claim 14 wherein each of said spring fingers includes a third retaining means for supporting said plug body against lateral movement when said plug body is disposed in said socket chamber.

16. A coupling assembly as set forth in claim 8 wherein said spring fingers are leaf springs, each of said leaf springs having an inwardly protruding portion, said inwardly protruding portion of each of said leaf springs being disposed in locking engagement with said plug body when said plug body is disposed in said socket chamber and said sleeve means is in said engaged position, said inwardly protruding portions of each of said leaf springs being disposed between a first bend and a second bend in each of said leaf springs, said plug body having an annular retaining surface which engages said inwardly protruding portions on said leaf springs such that said plug body is retained in said socket chamber when said slide means is in said engaged position.

17. A coupling assembly for connection a pair of conduits in fluid communication, said coupling assembly comprising a socket body adapted to be connected with one of said conduits, said socket body including inner surface means for defining a socket chamber and outer surfce means for defining a plurality of spaced apart side openings in said socket body, a plug body adapted to be telescopically received in said socket chamber, a plurality of spaced apart spring fingers, each of said spring fingers having at least a pair of spaced apart projections which are received in said side openings in said socket body to retain said spring fingers against axial movement relative to said socket body, one of said side openings in said socket body having an annular configuration and circumscribes said socket body, at least one of said projections on each of said spring fingers being disposed in said annular side opening, said plurality of side openings in said socket body including a plurality of spaced apart side openings each of which receives an associated one of said plurality of projections, slide means disposed on said socket body for holding said spring fingers in locking engagement with said plug body to thereby retain said plug body in said socket chamber, said slide means being movable relative to said socket body between an engaged position in which said slide means is effective to hold said spring fingers in engagement with said plug body and a disengaged position in which said slide means is ineffective to hold said spring fingers in engagement with said plug body, said slide means including surface means for preventing movement of said projections on said spring fingers out of said side openings in said socket body when said slide means is in said engaged and disengaged positions.

18. A coupling assembly as set forth in claim 17 wherein said plurality of spaced apart side openings are disposed axially outwardly from said side opening having an annular configuration.

19. A coupling assembly as set forth in claim 18 wherein said plurality of spaced apart side openings have a surface which engages the associated one of said plurality of projections to retain the fingers against sideward movement in a direction transverse to the longitudinal axis of the spring finger.

20. A coupling assembly for connecting a pair of conduits in fluid communication, said coupling assembly comprising a socket body adapted to be connected with one of said conduits, said socket body including inner surface means for defining a socket chamber and outer surface means for defining a plurality of spaced apart side openings in said socket body, a plug body adapted to be telescopically received in said socket chamber, a plurality of spaced apart spring fingers which are leaf springs, each of said spring fingers having at least a pair of spaced apart projections which are received in said side openings in said socket body to retain said spring fingers against axial movement relative to said socket body, said projections are disposed on axially inner end portions of said spring fingers, said spring fingers having second portions disposed axially outwardly of said inner end portions, slide means disposed on said socket body for holding said spring fingers in locking engagement with said plug body to thereby retain said plug body in said socket chamber, said slide means being movable relative to said socket body between an engaged position in which said slide means is effective to hold said spring fingers in engagement with said plug body and a disengaged position in which said slide means is ineffective to hold said spring fingers in engagement with said plug body, said slide means including surface means for preventing movement of said projections on said spring fingers out of said side openings in said socket body when said slide means is in said engaged and disengaged positions, said second portions of said spring fingers being spaced apart from said plug body when said plug body is disposed in said socket chamber and said slide means is disposed in said disengaged position, said second portion of each of said spring fingers having an inwardly protruding portion, said inwardly protruding portion of each of said spring fingers being disposed in locking engagement with said plug body when said plug body is disposed in said socket chamber and said slide means is in said engaged position, said inwardly protruding portions on each of said spring fingers being disposed between a first bend and a second bend in each of said second portions of said spring fingers, said plug body having an annular retaining surface which engages said inwardly protruding portions on said spring fingers such that said plug body is retained in said socket chamber when said slide means is in said engaged position.

21. A coupling assembly as set forth in claim 20 wherein said surface means on said slide means includes a cam portion which engages said second portions of said spring fingers which are biased outwardly in said disengaged position thus moving said second portions of said spring fingers inwardly as said slide means travels from said disengaged position to said engaged position where said second portions of said spring fingers are disposed in locking engagement with said plug body.

* * * * *